United States Patent [19]

Caprioli et al.

[11] Patent Number: 4,820,648

[45] Date of Patent: Apr. 11, 1989

[54] METHODS FOR USE IN THE MASS ANALYSIS OF CHEMICAL SAMPLES

[75] Inventors: Richard M. Caprioli, Bellaire, Tex.; John S. Cottrell, Manchester, England

[73] Assignee: Spectros Limited, United Kingdom

[21] Appl. No.: 767,820

[22] Filed: Aug. 21, 1985

[51] Int. Cl.[4] .......... G01N 1/28; G01N 24/00

[52] U.S. Cl. .......... 436/89; 250/288; 436/173

[58] Field of Search .......... 250/288; 436/89, 173

[56] References Cited

U.S. PATENT DOCUMENTS

| | | | |
|---|---|---|---|
| 4,239,967 | 12/1980 | Carr et al. | 250/281 |
| 4,267,457 | 5/1981 | Nakagawa et al. | 250/522 |

FOREIGN PATENT DOCUMENTS

| | | | |
|---|---|---|---|
| 3028116 | 2/1982 | Fed. Rep. of Germany . | |
| 56-125669 | 10/1981 | Japan | 436/89 |

OTHER PUBLICATIONS

Caprioli et al.; Fast Atom Bombardment for Real-Time Analysis of Peptide Fragments From Protein Digestions; Ca98(9):67824p, 1983.

Van Nostrand's Encyclopedia 5th edition, 1976, p. 422.

Self & Parente, "The Combined Use of Enzymatic Hydrolysis . . . Peptide Sequencing", vol. 10, No. 2, pp. 78-82.

Brodbelt & Cooks, "An Exceedingly Simple Mass Spectrometer Interface . . . Analysis", 57, pp. 1155-1157.

Hong et al., "Simultaneous Analysis of C-Terminal Amino Acid . . . Digestion", vol. 10, No. 8, 450-457.

Aimoto et al., "Amino Acid Sequence of a Heat-Stable Enterotoxin . . . Coli", 129, pp. 257-263.

Caprioli et al., "Performance of a Fast Atom Brombardment Source . . . Mass Spectrometer", vol. 10, No. 2, pp. 94-97.

Bradley et al., "Peptide Sequencing Using the Combination of Edman . . . Mass Spectrometry", vol. 104, No. 4, pp. 1223-1230.

Caprioli et al., "Fast Atom Bombardment For Real--Time Analysis of Peptide Fragments . . .", 46, pp. 419-422.

Smith & Caprioli, "Following Enzyme Catalysis . . . Mass Spectrometer", vol. 10, No. 2, pp. 98-102.

*Primary Examiner*—Barry S. Richman
*Assistant Examiner*—Michael S. Gzybowski
*Attorney, Agent, or Firm*—Leydig, Voit & Mayer

[57] ABSTRACT

A probe and method for using the same for supporting a sample in an ion source of a mass spectrometer comprises a target formed by a receptacle for a liquid sample in which the sample passes by diffusion to the high vacuum side of a semipermeable membrane and/or in which the sample is held as a droplet by surface tension. In order to replenish the droplet surface, the supply can be arranged to overflow the receptacle.

2 Claims, 2 Drawing Sheets

METHODS FOR USE IN THE MASS ANALYSIS OF CHEMICAL SAMPLES

BACKGROUND OF THE INVENTION

This invention relates to mass spectrometry methods for use in the continuous analysis of a chemical sample, Methods of using mass spectrometers for the analysis of samples which do not change with time are well known, but in the use of mass spectrometers for analysis of the time profile of a chemical reaction, the problem arises of locating the sample in an ion source at the moment at which the reaction products are to be analysed.

It has been suggested (see Anal Chem 1985,57,1153-55) that the time profile of a chemical reaction can be monitored by passing aqueous samples through semipermeable silicon capillary tubing of which a loop is sealed within a high vacuum system, the inlet and outlet ends of the tubing being outside the vacuum system. Samples passing through the tubing wall enter an area which is connected by ducting to an ion source of a triple quadrupole mass spectrometer. However, this approach is only applicable to the analysis of volatile samples.

SUMMARY OF THE INVENTION

The present invention provides a method for the continuous analysis of a sample of a biopolymer, such for example as a protein, which comprises reacting the biopolymer sample in a carrier liquid with a substance which sequentially removes terminal units of the biopolymer, and forms reaction products, defining a surface and locating the surface in a stationary position in a vacuum environment, causing a supply of loquid containing the reaction products to flow continuously from a high pressure region to the surface and be deposited thereon, ionizing the deposited reaction products by causing a beam of particles or radiation to impinge thereon, and mass analysing the ions produced by the ionization, thereby identifying the terminal units sequentially removed from the biopolymer by determining the reduction with time of the molecular mass of the biopolymer as the terminal units are removed.

In a preferred embodiment, a probe maybe inserted into a mass spectrometer which, in operation, permits a continuous replenishment of the sample at the target for irradiation. The mass spectrometer source in which the probe is located ionises the sample by F.A.B. (Fast Atom Bombardment), or any other sputtering technique.

BRIEF DESCRIPTION OF THE DRAWINGS

The invention will now be more particularly described by way of example only, with reference to the accompanying drawings in which.

DESCRIPTION OF THE PREFFERED EMBODIMENTS

Figure 1:
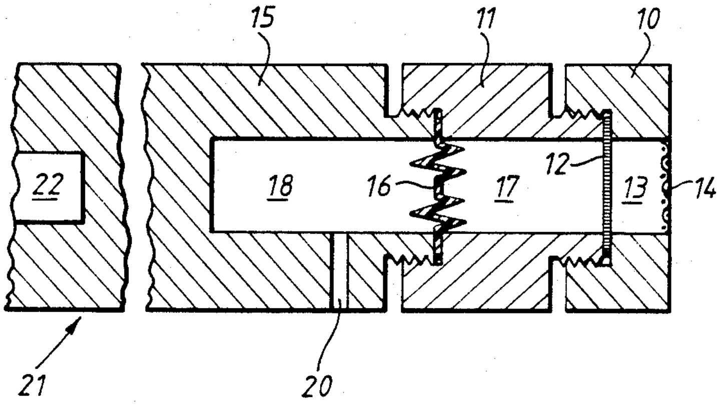
FIG. 1 is a diagrammatic section through a first form of probe in accordance with the invention.

The probe illustrated in FIG. 1 comprises at least three sections, a first or terminal section 10 which forms a target carrier, the section being of tubular shape and screwthreaded to a second tubular section 11 to grip therebetween the rim of a semi-permeable membrane 12. The cylindrical space within the tube section 10 forms a reaction cell 13 the axially-inner boundary of which is defined by the semi-permeable membrane 12. At the outer end of the cell, a high transparency stainless steel mesh 14 can be located to assist in defining a physical boundary of liquid located in the cell.

A third tubular section 15 forms, or is mounted on, the main part of the probe shaft 21, and is screwthreaded to the axially-inner end of section 11 to grip therebetween the rim of a flexible impermeable membrane 16. Membranes 12 and 16 define between them a reservoir 17 within section 11. The axially-outer end portion of section 15 is hollow to form a chamber 18 which is closed at its outer end by the impermeable membrane 16 and can communicate with a pressure source via an equilibration vent 20 in the wall of section 15.

The inner end of the probe shaft 21 can support an ultrasonic transducer 22 for a purpose to be described below. The probe shaft, in use, can be introduced into the mass spectrometry source through a vacuum lock, without venting the source. The tubular sections 10,11 and 15 thus form a casing which separates the high vacuum within the ion source from the relatively high ambient pressure, yet permits liquid to be introduced into the vacuum space through a restricted path formed by the semipermeable membrane 12, or otherwise as described below.

An example of the use of the probe will now be considered. The reaction cell 13 contains a solution of 50:50 V/V g1ycerol and water, together with the sample under investigation (e.g. a peptide at a concentration of 5 microgrammes per microlitre), an enzyme mixture, buffer salts and other ingredients dependent on the nature of the experiment. The volume of the total mixture will be typically 20 microlitres. The purpose of the reaction is to permit enzymatic degradation of the sample to take place and to allow the reaction products to be brought to the target of the probe where they will be ionised in situ and the ions to be mass analysed so that a time profile is produced of the reaction between the enzyme and the sample.

Since the diameter and length of the reaction cell will be typically three millimetres, the droplet of liquid within the cell will be retained by surface tension.

Reservoir 17 contains either pure water, or a solution of g1ycerol in water. The semipermeable membrane 14, which can be polymeric, conveniently has an effective molecular weight cut off to retain the emzyme (e.g. Millipore "Pellicon" ultrafiltration disc or thin cellulose sheet) Alternatively it could be a sintered porous material, a perforated plate, or a gauze or mesh. Its essential property is that it is water permeable. The purpose of the impermeable membrane 16 is to permit volume changes to occur in the reservoir without alteration in the pressure. Membrane 16 could therefore be replaced by a sliding gas-tight plunger. The vent 20 maintains pressure equilibrium during pump down and venting of the probe.

The principle of operation will now be described. Since the vapour pressure of water is extremely high relative to that of glycerol, on exposure to the high vacuum, water is lost from the surface of the mixture in reaction cell 13 at a much greater rate than glycerol. Shortly after introduction into the high vacuum source of the mass spectrometer, a water concentration gradient will be created, the water content of the mixture in cell 13 being very low at the surface and very high at the interface with membrane 12. Under steady state conditions a diffusion limited flow of water will take place from the membrane 12 to the surface of the mixture in cell 13. The magnitude of the concentration gradient, and hence the rate of diffusion of water towards the surface, will depend on the distance between the membrane interface at the inner end of cell 13 and the vacuum interface at the outer end of cell 13. The enzymatic hydrolysis of the sample in cell 13 can only proceed in the presence of water. The purpose of reservoir 17 is to replenish the water content of the reacting mixture in cell 13 by diffusion through membrane 12. In order to maintain the volume of mixture constant over an extended time period, it may be found necessary to include a percentage of glycerol in reservoir 17.

This reaction cell relies on the continuous diffusion of reaction products towards the surface of mixture in cell 13, where ionisation takes place.

The rate of transport of material between these regions may be accelerated by ultrasonic agitation caused by the transducer 22 embedded in, or adjacent to, probe shaft 21.

It may be required to have independent control over the pressure in reservoir 17. This could be achieved by omitting the equilibration vent 20 and coupling chamber 18 to an external pressure control apparatus by means of a tube passing through the probe shaft 21. The pressure of gas or fluid in chamber 18 would be transmitted to reservoir 17 via flexible membrane 16. Alternatively, the flexible membrane 16 could be replaced by a rigid wall into which a tube is sealed connecting reservoir 17 directly with an external pressure control apparatus. In this case, the pressure transmitting fluid could be of the same composition as the water/glycerol solution in reservoir 17. Provision of a second connecting tube between reservoir 17 and the external pressure control apparatus would enable the water/glycerol solution to be circulated between the external apparatus and reservoir 17. By this means, the temperature of the probe tip could be regulated according to the temperature of the solution. This would provide additional control over the rate of reaction, since the enzymes generally function most efficiently at about 37° C.

A typical experimental procedure would be as follows: During assembly of the probe, reservoir 17 is filled with a degassed solution of 90% water, 10% glycerol (by volume). Reaction cell 13 is filled with a degassed solution of 10 microlitres water, 10 microlitres glycerol, Substance-P (a polypeptide) and a mixture of carboxypeptidase Y and carboxypeptidase P. The relative concentrations of the enzymes are such as to give complete hydrolysis of the polypeptide over the duration of the experiment (typically a few minutes per amino acid residue).

The probe is introduced through a vacuum lock into a standard FAB source. A short period is allowed for the mixture to equilibrate under vacuum conditions. A beam of primary particles or radiation is allowed to impinge upon the surface of the reaction mixture. This primary beam would typically be xenon atoms, but could equally well be caesium ions, fission fragments, photons, etc., etc. The primary beam causes ions to be sputtered from the surface of the reaction mixure These ions are then drawn into a mass spectrometer and mass analysed.

Observation of the mass spectrum of the reaction mixture will reveal the following features: Initially, there will be a strong peak corresponding to the intact polypeptide molecule. If the mass spectrometer is transmitting positive ions this will be the protonated molecular ion $(M+H)^+$. In the case of Substance -P (H-Arginine-Proline-Lysine-Proline-Glutamine -Glutamine-Phenylalanine-Phenylalanine-Glycine-Leucine-Methionine-$NH_2$) the protonated molecular ion is observed at m/z 1349. As the polypeptide is digested by the enzyme mixture, amino acid residues are sequentially removed from the C terminus of the chain, thus we observe the appearance of new molecular ions corresponding to the loss of Met (yielding m/z 1218), loss of Leu (yielding m/z 1105), etc. Thus the mass difference between consecutive molecular ions identifies the amino acid residue removed from the chain, so yielding the amino acid sequence of the polypeptide. The only ambiguity in the sequence information provided by this technique is failure to distinguish between residues of the same molecular weight. Amongst the common amino acids there are only two examples of this: Glutamine and Lysine (both m/z 128) and the isomers Leucine and isoLeucine (both m/z 113).

An advantage of this technique is that the molecular ion intensities are obtained as a function of time. Some molecular ion peaks will be of relatively low intensity, possibly because the ion is produced by a cleavage which occurs particulary slowly resulting in a low instantaneous concentration of that species Observation of the time dependant behaviour of the "parent" and "daughter" molecular ions will allow the time dependance of the "missing" molecular ion to be predicted. Since there will be only one or two possible mass values for the "missing" ion, this information will enable extremely weak molecular ions to be distinguished from interfering peaks which do not show the expected time dependence.

It will be appreciated that the application of this reaction cell is not restricted to the C-terminus sequencing of peptides and proteins. Use of aminopeptidase enzymes permits peptides to be sequenced from the N-terminus. Alternatively, polysaccharides, oligonucleotides and other biopolymers may be sequenced using the appropriate reaction mixture.

The cell would also be ideal for the observation and measurement of enzyme kinetics and any experiment in which observation time would be limited by evaporation of a volatile solvent or matrix.

Figure 2:
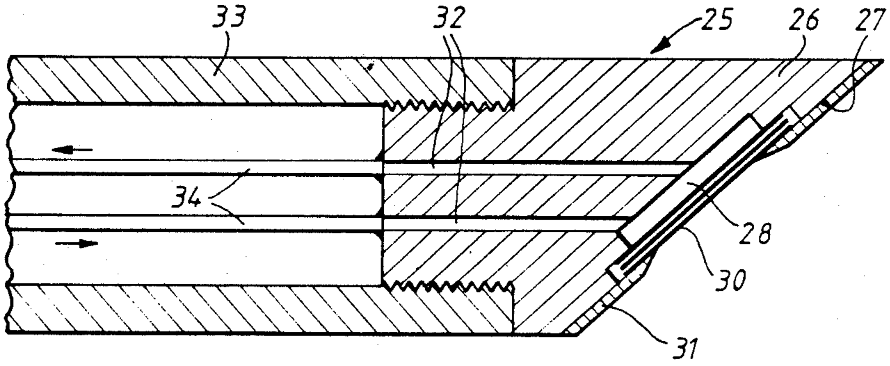
FIG. 2 is a diagrammatic section through a second form of probe in accordance with the invention.

A modification of the probe to enable a continuous flow of liquid sample to be analysed, is illustrated in FIG. 2.

As shown, the probe tip 25 comprises a solid cylindrical tip member 26 having an end surface 27 inclined to the axis of the probe and containing a recess, forming a reservoir 28, which is closed on its outer side by a semi-permeable membrane 30. This membrane can be made of any of the materials described in relation to membrane 12. The membrane 30 is held in position on the end of the tip member by an annular cap 31. Capillary passages 32 extend parallel to the axis of the probe, through the length of tip member into the reservoir 28. The tip member is screwthreaded to a tubular shaft 33 through which capillary tubes 34, for example of quartz, extend and are sealed to the rearward ends of the capillary passages.

Figure 3:
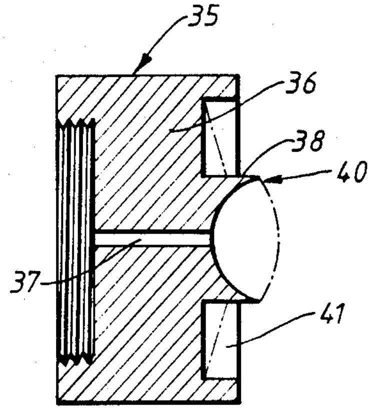
FIG. 3 is a diagrammatic section through the probe tip of another form of probe.

A further modification of the probe, again enabling a continuous flow of liquid sample to be analysed, is illustrated in FIG. 3.

As shown, the probe tip 35 comprise a tip member 36 which contains a central capillary passage 37 leading to a cup portion 38 at the forward extremity of the tip member. The lip 40 of the cup portion has a sharp edge and the cup portion is surrounded by an annular overflow channel 41.

In this case, a slow continuous delivery of a liquid sample with a high surface tension enables a dome-shaped droplet to form in the cup. If the delivery rate of the sample is maintained slightly greater than the evaporation rate of the liquid component of the sample, a continuous overflow will occur to maintain a constant dome shape of the droplet in the cup.

Figure 4:
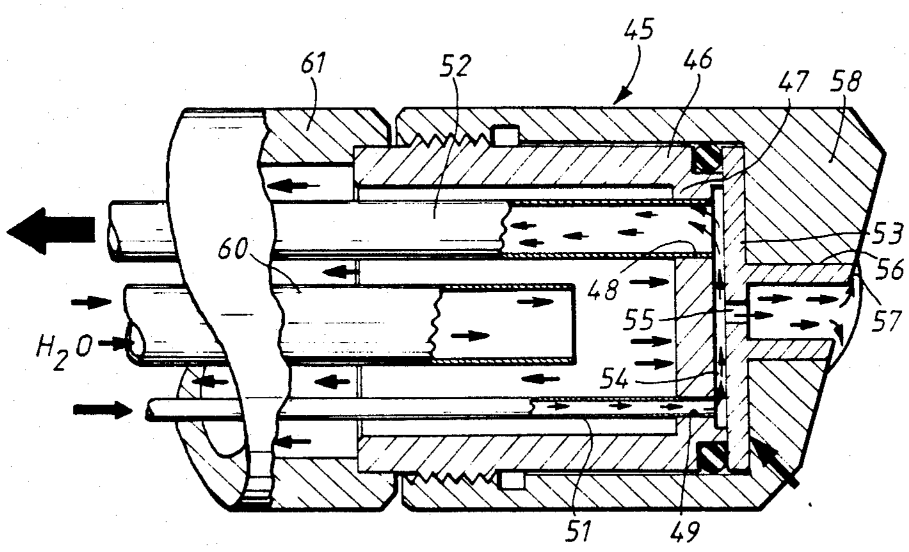
FIG. 4 is a diagrammatic section through yet another form of probe.

Another embodiment of the invention which permits a continuous flow of liquid sample to be analysed, is illustrated in FIG. 4.

The probe tip 45, shown in FIG. 4, comprises a tubular tip member 46 closed at its outer end by an end wall 47 containing two apertures 48,49 in which the ends of supply and return pipes 51,52 are sealed. A cover plate 53, for example of stainless steel, is fitted to the end wall and sealed thereto around it periphery to form therebetween a chamber 54 into which the supply pipe 51 discharges and from which the return pipe 52 discharges. In this way a continuous flow of sample can pass through the chamber.

At the centre of the cover plate 53, is a restricted outlet orifice 55 which leads into a cup 56 for containing liquid sample. Surrounding the cup, and flush with the lip 57 of the cup, is a porous ceramic mass 58 into which liquid sample which overflows the lip of the cup can be absorbed.

The hollow interior of the tubular tip member also contains a liquid supply pipe 60 through which water or other suitable liquid can be caused to flow over the rearward surface of the end wall and thereby control the temperature of the end wall and the liquid sample within the reservoir.

The tip member 46 is mounted on a tubular probe shaft 61 through which extend the sample supply and return pipes 51,52 as well as the temperature-control liquid supply pipe 60.

In operation of this embodiment, the flow of liquid sample, which can be a reaction mixture, through the orifice is at a rate slightly greater than the rate of evaporation, and the excess is absorbed by the porous ceramic mass. A convenient flow rate would be about one microlitre per minute.

The shape and angle of inclination of the end surface of the probe tip in each of the embodiments described above will depend on the geometry of the mass spectrometer ion source.

We claim:

1. A method for the continuous analysis of a sample of a boipolymer comprising reacting a biopolymer sample in a carrier liquid with a substance which sequentially removes terminal units of the biopolymer and forms reaction products, defining a surface and locating said surface in a stationary position in a vacuum environment, causing a supply of liquid containing said reaction products to flow continuously from a high pressure region to said surface and be deposited thereon, ionising the deposited reaction products by causing a beam of particles or of radiation to impinge thereon, and mass analysing the ions produced by the ionisation thereby identifying the terminal units sequentially removed from the biopolymer by determining the reduction with time of the molecular mass of the biopolymer as the terminal units are removed.

2. A method according to claim 1 wherein the step of defining the surface includes providing a porous surface and wherein the step of depositing the liquid and reaction products on the surface is followed by evaporating the liquid to thereby leave a residue of reaction products on the porous surface.

* * * * *